United States Patent
Weidel

(10) Patent No.: US 6,863,412 B2
(45) Date of Patent: Mar. 8, 2005

(54) DEVICE FOR VEHICLE LIGHTING

(75) Inventor: Edgar Weidel, Senden (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/416,255

(22) PCT Filed: Nov. 6, 2001

(86) PCT No.: PCT/EP01/12810
§ 371 (c)(1),
(2), (4) Date: May 8, 2003

(87) PCT Pub. No.: WO02/38413
PCT Pub. Date: May 16, 2002

(65) Prior Publication Data
US 2004/0022051 A1 Feb. 5, 2004

(30) Foreign Application Priority Data
Nov. 9, 2000 (DE) .......................... 100 55 462

(51) Int. Cl.⁷ ............................................. G01D 11/28
(52) U.S. Cl. .................. 362/26; 362/299; 362/328; 362/511; 362/516; 362/520
(58) Field of Search .................... 362/26, 27, 299–301, 362/259, 509–512, 516, 520, 544, 545

(56) References Cited

U.S. PATENT DOCUMENTS

| 4,348,108 A | * | 9/1982 | Shindow ..................... 356/125 |
| 4,987,379 A | * | 1/1991 | Hughes ....................... 330/253 |
| 5,582,480 A | | 12/1996 | Zwick et al. ................ 362/298 |
| 5,796,504 A | * | 8/1998 | Sonderegger et al. ....... 398/110 |
| 5,930,055 A | | 7/1999 | Eisenberg ................... 359/728 |
| 2002/0141065 A1 | * | 10/2002 | Cowan et al. .............. 359/599 |

FOREIGN PATENT DOCUMENTS

| DE | 4007646 | 9/1991 | |
| DE | 4107850 | 6/1992 | |
| GB | 302656 | 12/1927 | |
| GB | 2 289 974 | * 6/1995 | ............ G11B/7/12 |

* cited by examiner

Primary Examiner—Sandra O'Shea
Assistant Examiner—Mark Tsidulko
(74) Attorney, Agent, or Firm—Davidson, Davidson & Kappel, LLC

(57) ABSTRACT

A device for vehicle lighting includes a deviating prism which deflects a light beam by approximately 180 degrees from a direction of incidence in which the light beam is emitted by a light source. A reflector is also provided which deflects the light beam so that the light beam is emitted substantially transversely to the direction of incidence.

17 Claims, 6 Drawing Sheets

DEVICE FOR VEHICLE LIGHTING

BACKGROUND

The present invention relates in general to vehicle lighting, and specifically to a device for vehicle lighting in which an emitted light beam used for lighting is deflected by a deviating prism and a reflector.

Poor visibility at night is a stressful and dangerous situation, dreaded by many drivers. The frequency of accidents is decidedly higher at night as a result of poor visibility, compared with driving during the day and with good visibility. The use of the low beam, because of oncoming traffic, results in low visibility which is misjudged by many drivers. This results in late recognition of unlighted obstacles, pedestrians, bicyclists without light, and animals, thus resulting in accidents. In addition, the lights of oncoming vehicles and their reflection glare the driver, in particular when the road is wet; i.e., the driver briefly drives into a black hole. Particularly at risk here are night-blind drivers and older drivers because of their reduced sight. Rain, fog, and snowfall make the visibility conditions even worse.

An improvement of visibility at night is achieved by using an optoelectronic system as described in German Offenlegungschrift [laid open publication] 40 07 646.6.

The system records a video image of a scene and displays it to the driver in a suitable form. The displayed image shows substantially more than the driver may see directly through the windshield with his eyes. In addition to the normal headlights, the system has two "laser headlights" which use laser diodes, emitting in the near infrared range, as a light source. Since infrared light is almost invisible to the human eye, such lighting may be used "in the permanently turned-on position." However, the necessary extra space for the laser headlights in addition to the normal headlights is a disadvantage.

SUMMARY OF THE INVENTION

An object of the present invention is to provide a device for vehicle lighting requiring little space.

The present invention provides a device for vehicle lighting in which the light beam emitted, used for lighting, is deflected by a deviating prism and a reflector.

It is conceivable according to the present invention to design the device such that the reflector emits the light beam in a direction which is rotated approximately 90 degrees with respect to the direction of incidence of the light beam into the deviating prism. It is possible in this way to place the light source, i.e., the light beam supply, directly behind the reflector, thereby creating a flat, space-saving structure in the lighting device by using a bent beam path. The light beam may advantageously be supplied to the device via a light guide, but it is also conceivable to generate the light beam by using a laser light source which is contained in the device itself. The use of a laser as a light source has the advantage of a narrow-band illumination, making it possible to dimension the optical elements, contained in the lighting device according to the present invention, in a particularly accurate manner and adapted to the desired beam path.

BRIEF DESCRIPTION OF THE DRAWINGS

The present invention is explained in greater detail in the following with reference to the drawings based upon an exemplary embodiment in which a laser is used as a light source.

DETAILED DESCRIPTION

Figure 1:
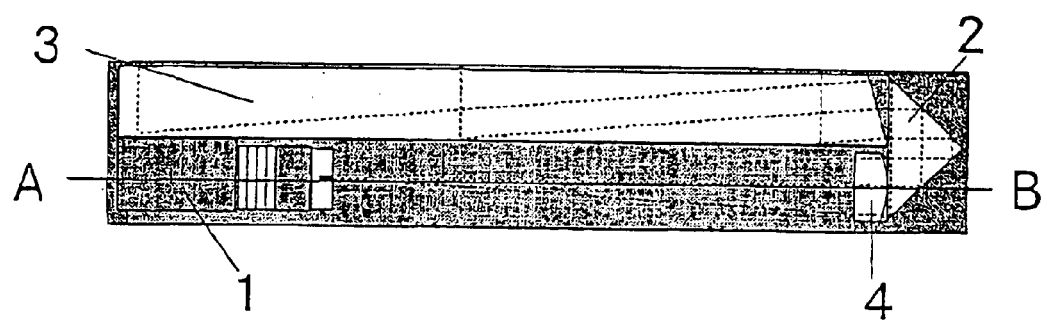
FIG. 1 shows the top view of a laser headlight according to the present invention (section through plane E–F of FIG. 3.
Figure 2:
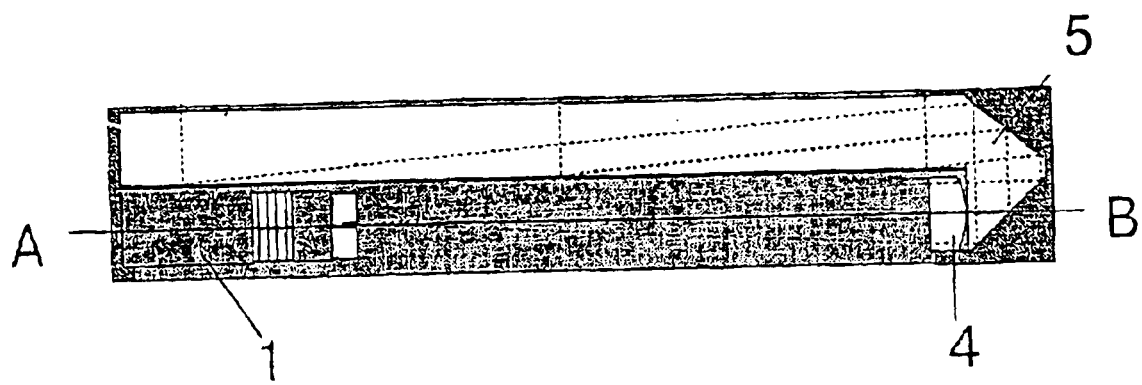
FIG. 2 shows the top view of a laser headlight according to the present invention, alternatively to the one in FIG. 1 (section through plane E–F of FIG. 3).
Figure 3:
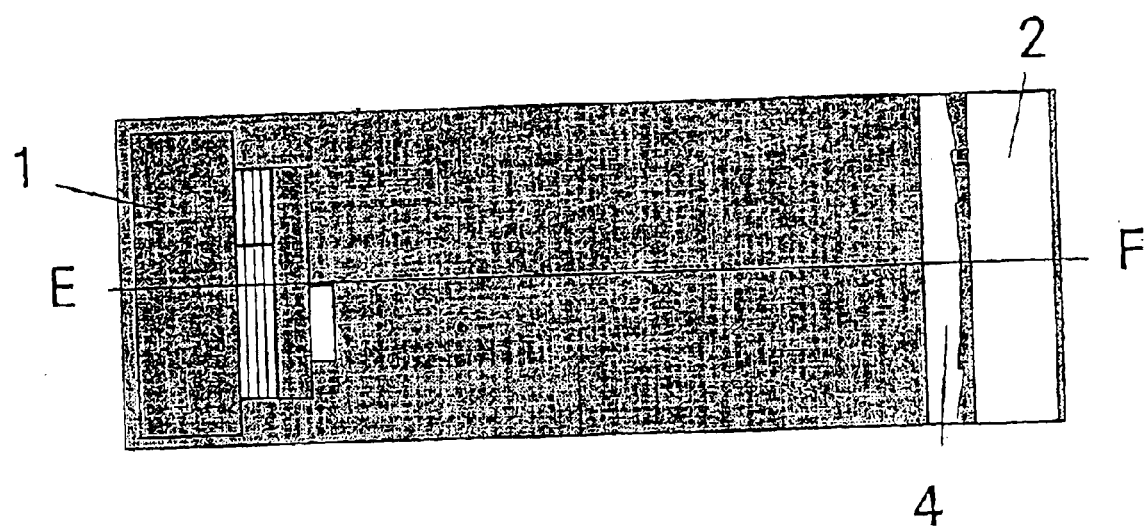
FIG. 3 shows the rear view of a laser headlight according to FIG. 1 or 2 (section through plane A–B of FIG. 1).
Figure 4:
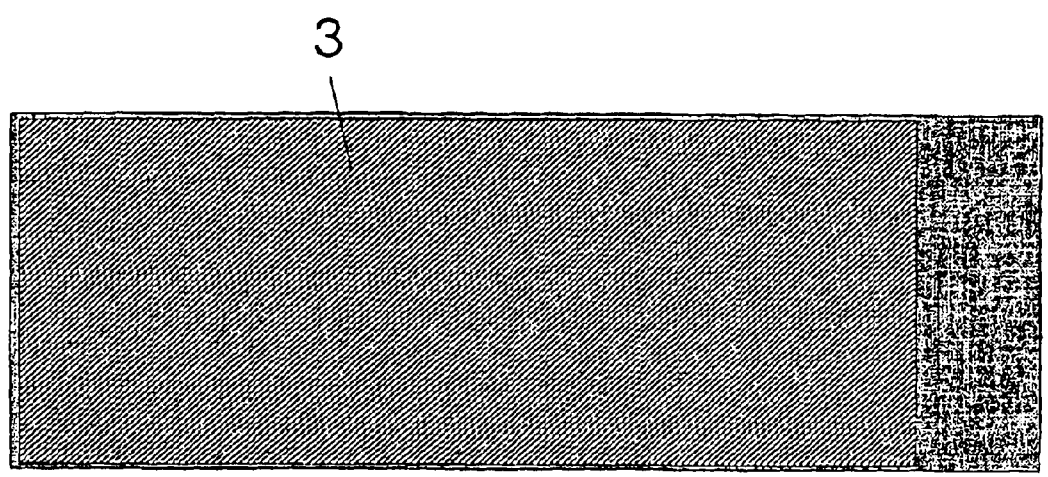
FIG. 4 shows an exemplary front view of a laser headlight according to FIG. 1 or 2 (section through plane A–B of FIG. 1).

It is apparent in FIG. 1 and FIG. 2 that the headlight according to the present invention may have an extremely flat design.

In FIG. 1, reflector/diffuser 3 and deviating prism 2 are each designed as a separate component. Laser diode 1 is located on a heat sink on the rear side of the headlight and sends the light in the direction of lens 4. Through this lens 4, the light subsequently hits a deviating prism 2. From there the light arrives in reflector/diffuser 3, via which it is beamed out.

The embodiment of the device according to the present invention illustrated in FIG. 2 is similar to the device illustrated in FIG. 1; however, diffuser 3 and deviating prism 2 are manufactured here as a one-piece component 5.

After emission, the light of laser diode 1 widens through diffraction. For the sake of clarity, the light beams emitted by the laser diode are depicted with dashed lines in FIGS. 1 and 2. It is conceivable here that by using a laser diode in the form of a Fabry-Perot diode, the light beams widen in one direction only by a small angle of +5° (FIG. 1), while they widen in the other direction by an angle of +20° (FIG. 2). Laser 1, used as a light source, is to be advantageously dimensioned such that the emitted light beam is widened on its way to lens 4 in such a way that the surface of lens 4 is optimally lighted. Surface-emitting laser diodes may be used here in an advantageous manner as light sources. Since these laser diodes have a symmetrical light emission, the dimensions of the headlight are to be advantageously adapted to the diode face; however, it is also conceivable to operate several laser diodes next to one another, in order to enlarge the light emission area.

Laser diodes emit the light out of a very small area of 1 $\mu m^2$ to 200 $\mu m^2$; the light spot may thus be considered to be punctiform. The laser diode is situated in the focal point of a planar-convex lens 4 which collimates the diverging light beam. The lens may be a simple lens, a Fresnel lens, or an achromatic lens, for example.

A deviating prism 2 deflects the light beam by approximately 180° and feeds it into a plate 3 whose inside is designed as a reflector and whose outside is designed as a diffuser.

Figure 5:
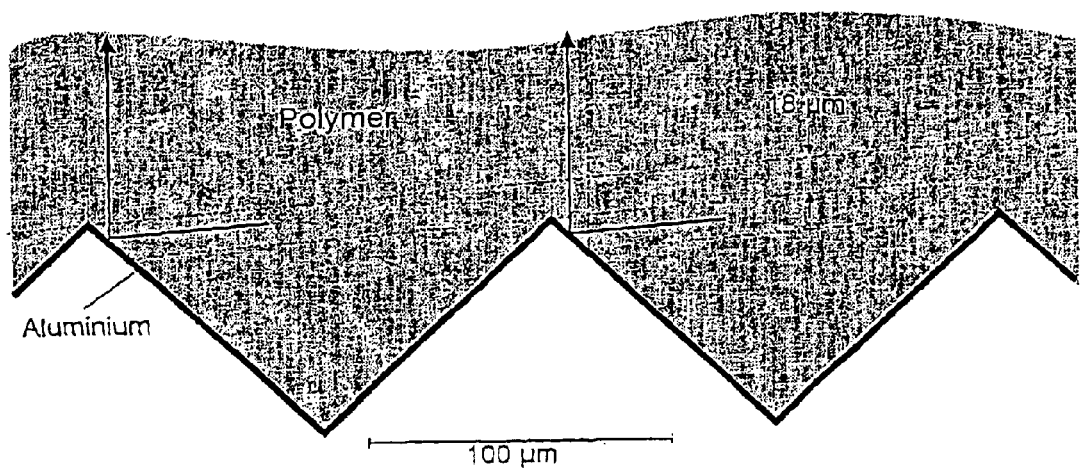
FIG. 5 shows an enlarged drawing of an advantageous reflector face of component 3 (reflector/diffuser).

A possible embodiment of the reflector is outlined in FIG. 5. In this drawing, after reflection, the light strikes the surface of the diffuser which is situated above the undulated, sawtooth-like structure of the reflector perpendicularly. This is not necessary, since the light may also incide at a different angle when an appropriate shape of reflector is used. A preferred direction is parallel to the axis of the vehicle, but for better lighting of curves, other directions are also reasonable. The light, coming from the left out of deviating prism 2, is reflected on a saw-tooth-like microstructure of reflector 3. This results in a maximization of the lighted surface of the structure. The lighting of the surface of the structure is outlined in FIG. 5. The microstructure may be manufactured by molding. By using laser diodes as a light source, coherence in time and space is so minor that no undesirable interference effects occur.

Figure 6:
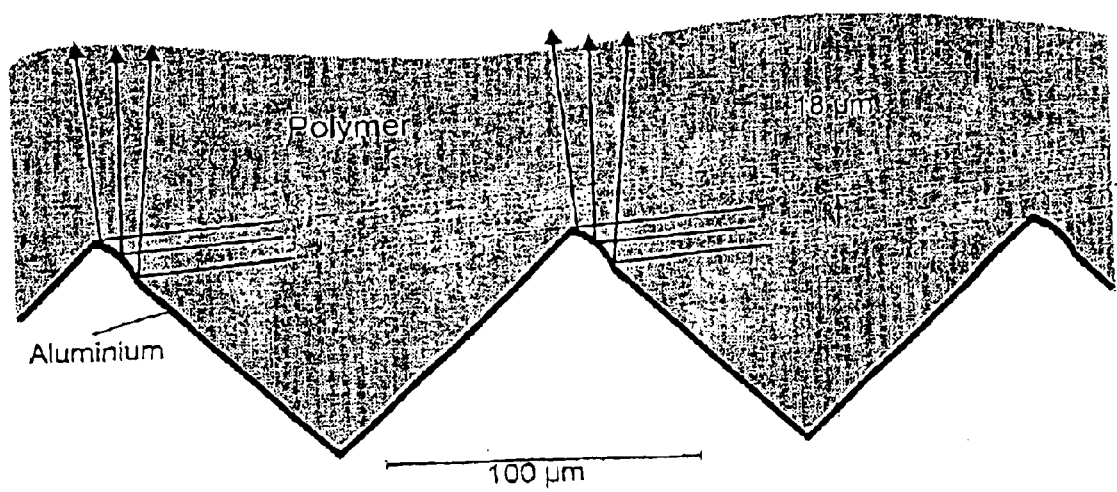
FIG. 6 shows an enlarged drawing of an advantageous reflector face of component 3, as an alternative to the one in FIG. 5 (reflector/diffuser).

The diffuser may be designed as a holographic diffuser, but it is also conceivable in an advantageous manner to integrate the diffuser into the structure of the reflector, whereby, as is apparent in FIG. 6, the undulated, saw-tooth-like structure is used with micro lenses or micro wedges. The diffuser forms the desired headlight distribution from the incoming collimated light beam. It is conceivable in a particularly inventive way to design the reflector, i.e., the diffuser, such that it has several zones of different reflectivity and diffusion properties. It is advantageous if the device is designed such that the light beam may be guided in a way that only certain zones of lens 4 and thus only certain zones of reflector 3 are lighted.

The device for vehicle lighting according to the present invention is of course not limited to mobile use in vehicles, but it may also be advantageously used in stationary applications, in particular in or on buildings. The device may therefore serve, for example, as a particularly flat back lighting for advertising signs and other graphic displays. It is also conceivable to use the device according to the present invention in an advantageous manner as a flat, integratable illumination for relatively thin media (e.g., walls in houses), or as a lighting wall or illumination of closet interiors or refrigerators.

What is claimed is:

1. A vehicle headlight comprising:
   a deviating prism configured to deflect a light beam by approximately 180 degrees from a direction of incidence, the light beam being emitted by a light source in the direction of incidence; and
   a reflector configured to deflect the light beam so as to emit the light beam out of the vehicle headlight, the light beam leaving the vehicle headlight substantially transversely to the direction of incidence.

2. The vehicle headlight as recited in claim 1 wherein the reflector is configured to emit the light beam in a direction rotated by approximately 90 degrees relative to the direction of incidence.

3. The vehicle headlight as recited in claim 1 further comprising the light source and wherein the light source includes a laser light source.

4. The vehicle headlight as recited in claim 3 wherein the laser light source includes a Fabry-Perot diode.

5. The vehicle headlight as recited in claim 3 wherein the laser light source includes a surface-emitting laser diode.

6. The vehicle headlight as recited in claim 5 wherein the laser light source further includes at least one additional surface-emitting laser diode operated in parallel with the surface-emitting laser diode so as to enlarge a light emission area.

7. The vehicle headlight as recited in claim 1 further comprising a lens configured to convey the light beam to the deviating prism.

8. The vehicle headlight as recited in claim 7 wherein the lens and the deviating prism form an integrated unit.

9. The vehicle headlight as recited in claim 1 wherein the light beam is conveyed to the deviating prism via a lens and wherein the light beam is guided to light only a subset of zones of the lens and to light only a subset of zones of the reflector.

10. The vehicle headlight as recited in claim 1 wherein the reflector includes an undulated sawtooth-like microstructure configured to deflect the light beam in a controlled manner.

11. The vehicle headlight as recited in claim 10 wherein an individual section of the undulated sawtooth-like micro structure lighted by the light beam includes at least one of micro lenses and micro wedges so that a surface of the reflector is capable of simultaneously acting as a diffuser.

12. The vehicle headlight as recited in claim 11 wherein the reflector includes a plurality of zones each having a respective different reflectivity property.

13. A lighting device comprising:
    a deviating prism configured to deflect a light beam by approximately 180 degrees from a direction of incidence, the light beam being emitted by a light source in the direction of incidence; and
    a reflector configured to deflect the light beam so as to emit the light beam out of the device, the light beam leaving the device substantially transversely to the direction of incidence.

14. The lighting device as recited in claim 13 wherein the lighting device is for a building.

15. The lighting device as recited in claim 13 wherein the lighting device is for a flat back lighting.

16. A device for vehicle lighting comprising:
    a deviating prism configured to deflect a light beam by approximately 180 degrees from a direction of incidence, the light beam being emitted by a light source in the direction of incidence; and
    a reflector configured to deflect the light beam so as to emit the light substantially transversely to the direction of incidence;
    wherein the light beam is conveyed to the deviating prism via a lens and wherein the light beam is guided to light only a subset of zones of the lens and to light only a subset of zones of the reflector.

17. The vehicle headlight as recited in claim 1 further comprising a diffuser downstream of the laser for diffusing the light beam.

* * * * *